US010423026B2

(12) United States Patent
Gao (10) Patent No.: US 10,423,026 B2
(45) Date of Patent: Sep. 24, 2019

(54) ARRAY SUBSTRATE, DISPLAY PANEL, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Yujie Gao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/869,733

(22) Filed: Jan. 12, 2018

(65) Prior Publication Data

US 2018/0136512 A1     May 17, 2018

Related U.S. Application Data

(63) Continuation-in-part of application No. PCT/CN2017/085885, filed on May 25, 2017.

(30) Foreign Application Priority Data

May 30, 2016    (CN) .......................... 2016 1 0371580

(51) Int. Cl.
G02F 1/1362 (2006.01)
G02F 1/1335 (2006.01)
G02F 1/1333 (2006.01)

(52) U.S. Cl.
CPC .. G02F 1/133512 (2013.01); G02F 1/133305 (2013.01); G02F 1/136286 (2013.01)

(58) Field of Classification Search
CPC ................. G02F 1/1335; G02F 1/1333; G02F 1/134363; G02F 1/136286; G02F 1/134309; G02F 1/1368; G02F 1/133512; G02F 1/133707; G02F 1/13439; G02F 1/133514; G02F 1/133345; G02F 1/136209; G02F 1/134336; G02F 1/1362; G02F 1/13;
(Continued)

(56) References Cited

U.S. PATENT DOCUMENTS 7,462,895 B2 * 12/2008 Park ........................ H01L 27/12
257/208
2006/0158597 A1    7/2006 Ito et al.
(Continued)

FOREIGN PATENT DOCUMENTS

CN         1808254 A       7/2006
CN       201174385 Y      12/2008
(Continued)

OTHER PUBLICATIONS

International Search Report and Written Opinion dated Sep. 4, 2017; PCT/CN2017/085885.
(Continued)

Primary Examiner — Thoi V Duong
(74) Attorney, Agent, or Firm — Ladas & Parry LLP (57) ABSTRACT

An array substrate, a display panel and a display device. The array substrate includes a base substrate including a plurality of pixel areas and a first data line on the base substrate and between adjacent pixel areas; a side slope angle of the first data line is not greater than about 60°.

9 Claims, 5 Drawing Sheets

(58) Field of Classification Search
CPC ............. G02F 1/133305; G02F 1/1343; G02F 2201/123; G02F 2201/52
See application file for complete search history.

(56) References Cited

U.S. PATENT DOCUMENTS

| | | | |
|---|---|---|---|
| 2008/0050852 A1* | 2/2008 | Hwang | H01L 27/1214 438/30 |
| 2010/0053507 A1 | 3/2010 | Song et al. | |
| 2012/0013817 A1* | 1/2012 | Kim | G02F 1/134363 349/41 |
| 2014/0036179 A1 | 2/2014 | Huang et al. | |
| 2015/0185565 A1 | 7/2015 | Park et al. | |
| 2015/0185568 A1 | 7/2015 | Zheng et al. | |
| 2017/0170201 A1 | 6/2017 | Chiu et al. | |

FOREIGN PATENT DOCUMENTS

| | | |
|---|---|---|
| CN | 102789088 A | 11/2012 |
| CN | 103728801 A | 4/2014 |
| CN | 104749839 A | 7/2015 |
| CN | 104952878 A | 9/2015 |
| CN | 105807524 A | 7/2016 |
| JP | 10104661 A | 4/1998 |

OTHER PUBLICATIONS

The First Chinese Office Action dated Jul. 10, 2018; Appln. No. 201610371580.4.

* cited by examiner

ARRAY SUBSTRATE, DISPLAY PANEL, AND DISPLAY DEVICE

The application is a continuation-in-part of the National Stage of the International Application No. PCT/CN2017/085885 filed on May 25, 2017 which claims priority of Chinese Patent Application No. 201610371580.4 filed on May 30, 2016, and the disclosure of the above International Application and the Chinese Patent Application is incorporated herein by reference in entirety as part of the present application.

TECHNICAL FIELD

Embodiments of the present disclosure relate to an array substrate, a display panel and a display device.

BACKGROUND

With the rapid development of curved television technology, curved televisions have gradually become a prevalent trend. The manufacture method of a curved liquid crystal display panel is performed as follows: first, two plane glass plates are aligned to form a cell, and then the glass plates that are aligned to form the cell are bent by a mechanical means, so as to obtain a curved display panel. The deformation of the plane glass plates are different at different positions of the plane glass plates after bending. This will lead to the different relative displacement of the black matrix at different positions of the panel from the array substrate, further lead to different transmittance of the panel, and affect the display uniformity of the panel.

SUMMARY

An embodiment of the present disclosure provides an array substrate, the array substrate comprises a base substrate comprising a plurality of pixel areas, and a first data line on the base substrate and between adjacent pixel areas; wherein a side slope angle of the first data line is not greater than about 60°.

For example, in an example, the array substrate further comprises a second data line that is adjacent to and in juxtaposition with the first data line and also between the adjacent pixel areas, and a side slope angle of the second data line is not greater than about 60°.

For example, in an example, a thickness of the first data line in a thickness direction of the base substrate is in a range of about 2000 Å to about 3500 Å.

For example, in an example, both of a thickness of the first data line and a thickness of the second data line in a thickness direction of the base substrate are in a range of about 2000 Å to about 3500 Å.

For example, in an example, the array substrate according further comprises a black matrix that is arranged over the first data line and the second data line, an orthographic projection of the first data line and an orthographic projection of the second data line on the base substrate are within an orthographic projection of the black matrix on the base substrate.

For example, in an example, the black matrix comprises a concave portion between the first data line and the second data line.

For example, in an example, the array substrate further comprises a concave portion between the first data line and the second data line.

Another embodiment of the present disclosure provides a flexible display panel comprising: any array substrate described above and an opposite substrate that is arranged opposite to the array substrate.

For example, in an example, a black matrix is arranged on a side of the opposite substrate, which side faces the array substrate; in a display area, an orthographic projection of the first data line on the base substrate is within an orthographic projection of the black matrix on the base substrate.

For example, in an example, in a width direction of the first data line, a ratio of a width of the black matrix to a distance between an outer side of the first data line and an outer side of the second data line is in a range of 1.5~2.0.

For example, in an example, the array substrate further comprises a second data line that is adjacent and in juxtaposition with the first data line and also between the adjacent pixel areas, a side slope angle of the second data line is not greater than about 60°, and in the display area, both of an orthographic projection of the first data line and the second data line on the base substrate are within an orthographic projection of the black matrix on the base substrate.

For example, in an example, in a width direction of the data line, a ratio of a width of the black matrix to a distance between an outer side of the first data line and an outer side of the second data line is in a range of 1.5~2.0.

For example, in an example, in a width direction of the data line, lengths of two sides of the black matrix exceeding beyond the first data line and the second data line are in a range of about 4 μm to about 8 μm.

For example, in an example, the array substrate further comprises a concave portion between the first data line and the second data line.

Still another embodiment of the present disclosure provides a display device comprising the above-described flexible display panel.

BRIEF DESCRIPTION OF THE DRAWINGS

In order to make technical details of the embodiments of the disclosure apparent, the accompanying drawings of the embodiments are described, obviously, the accompanying drawings described only relates to some embodiments of the disclosure and are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

A curved display device, for example, a curved television, usually can bring better visual experience; as the relevant technology of curved television are improved, curved televisions have gradually become a prevalent trend and occupy an increasingly important share in the market. At present, a curved display panel is usually manufactured by bending the cell-assembled flat display panel in a mechanical way. As for a curved liquid crystal display panel, the black matrix is usually arranged on one side of an upper substrate (color filter substrate) corresponding to the metal lines on the array substrate to prevent the light leakage of the curved panel that is caused by the orientation disorder of the liquid crystal molecules resulting from the electric field generated at the edges of the metal lines. The width of the black matrix is usually designed to be larger to compensate the displacement caused during cell-assembling the upper substrate and the bottom substrate to form a cell. As mentioned above, a curved panel is usually manufactured by bending the cell-assembled flat display panel in a mechanical way. In this process, the amounts of displacement at different positions between the upper substrate and the bottom substrate are different, leading to the different effective shielded areas of the black matrix with respect to the metal lines of the bottom substrate, and therefore the light leakage amounts at different positons of this curved liquid crystal display panel are different, affecting the display uniformity of the display panel.

Figure 1:
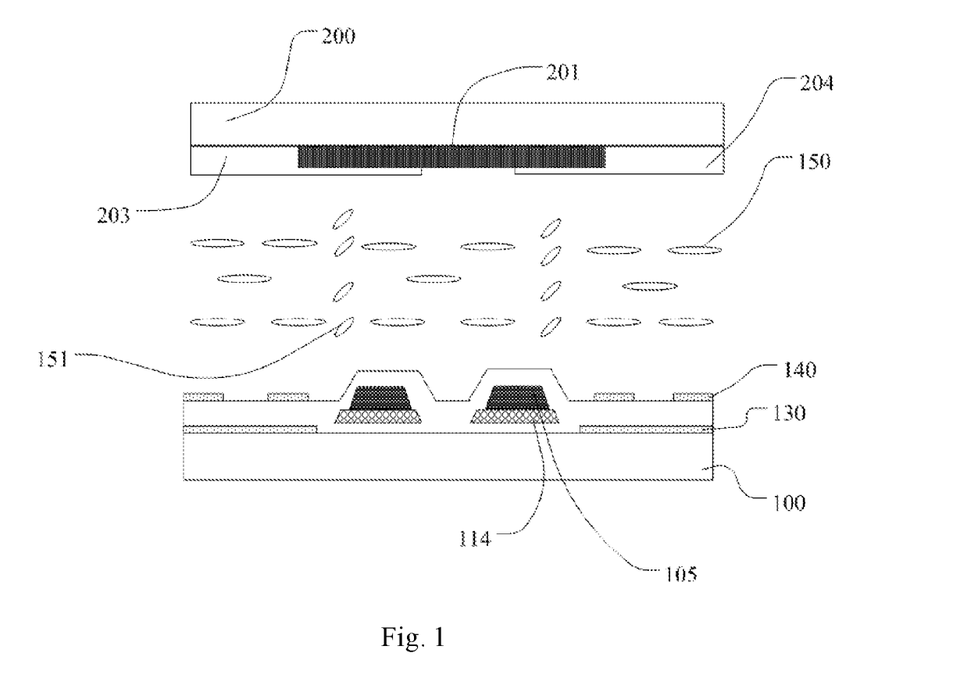
FIG. 1 is a section structural schematic diagram of a plane display panel.

FIG. 1 is a section structural schematic diagram of a plane display panel. Referring to FIG. 1, the display panel comprises an array substrate and an opposite substrate 200 that is arranged opposite to the array substrate. The array substrate comprises a base substrate 100, and a gate metal layer pattern, an active layer pattern 114, and a source/drain metal layer pattern that are arranged on the base substrate, and a pixel electrode 140 that is arranged on the source/drain metal layer pattern. The gate metal layer pattern, for example, comprises a gate line and a gate electrode that is connected with the gate line. The gate metal layer pattern, for example, can further comprise a common electrode line and a common electrode 130 as illustrated in the drawing. The active layer pattern 114, for example, can comprise a part that is used for a TFT (thin film transistor) and a part that is under the source/drain metal layer pattern (as illustrated in the drawing). The source/drain metal layer pattern, for example, can comprise a data line 105, a source electrode and a drain electrode. For example, the color filters of three primary colors, such as red, green and blue (color filters 203 and 204 of two different colors are shown in the drawing), are arranged on one side of the opposite substrate, which side faces the array substrate, to allow the light to pass through the color filters of three primary colors to present the corresponding colors. Further, for example, a black matrix 201 can be arranged on one side of the opposite substrate, that faces the array substrate, corresponding to the positions of the metal lines (for example, the two data lines in juxtaposition with each other that are shown in FIG. 1) on the array substrate to prevent the light leakage resulting from the deflection of the liquid crystal molecules caused by the interference of the side electric fields of the data lines. Liquid crystal material is filled between the array substrate and the opposite substrate, and for example, the liquid crystal material comprises the liquid crystal molecules 150 in normal state and the liquid crystal molecules 151 that are interfered by the side electric field of the data lines. Referring to FIG. 1, two sides of the black matrix 201 in the width direction of the date lines exceed beyond the outer opposite edges of the two data lines that are in juxtaposition with each other.

At present, the manufacturers of the display panel are all seeking solutions to this problem. For example, one solution is to remove the black matrix on the bending direction of the panel. Removal of the black matrix that is arranged on one side of the substrate can ensure the aperture ratios of all the regions to be the same no matter what amounts of the displacement between the upper substrate and the bottom substrate are, and ensure the transmittance uniformity of all the parts of the display panel. However, as for an ADS (Advanced Super Dimension Switch) mode display panel, the above mentioned solution can increase the process complexity of the ADS mode display panel.

Figure 2A:
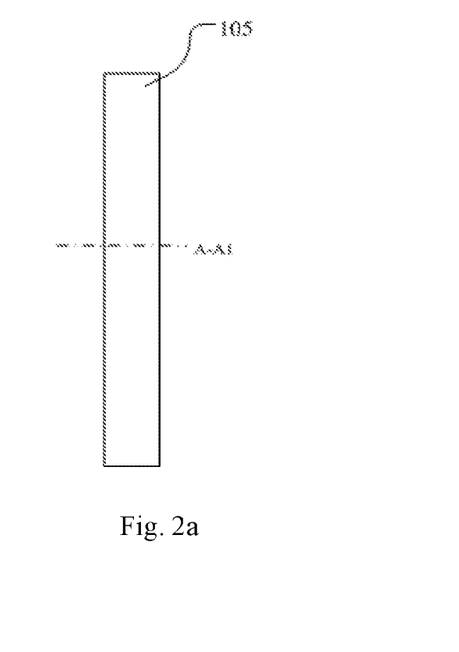
FIG. 2a is a top view schematic diagram of a data line.
Figure 2B:
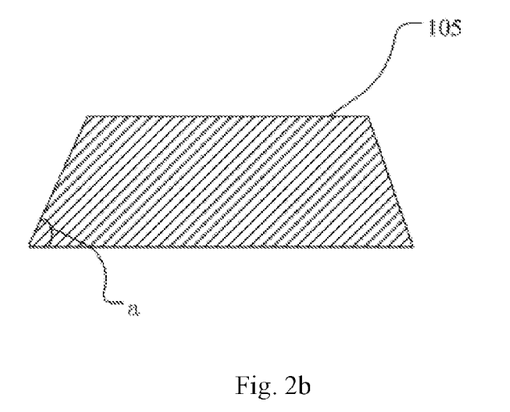
FIG. 2b is a section structural schematic diagram of the data line in FIG. 2a along the line A-A1.

In the pixel structure of ADS mode, the direction of the side electric field of the data line is the same as the direction of the friction orientation, that is, the same as the arrangement direction of the liquid crystal molecules. Therefore, in an ideal condition, the state changes of the liquid crystal molecules due to the side electric field caused by the data lines are quite small, that is, the side electric field caused by the data lines substantially cannot lead to light leakage. But in the manufacturing process of the array substrate, there are side slope angles on the two sides of the data lines, and therefore, the side electric field caused by the data lines can change the states of the liquid crystal molecules in normal orientation in the corresponding regions, leading to light leakage. The side slope angle is the angle between the bevel edge and the bottom edge in the section structural diagram along the width direction of the data line. FIG. 2a is a top view schematic diagram of a data line; FIG. 2b is a section structural schematic diagram of the data line in FIG. 2a along the line A-A1. For example, "a" in FIG. 2b is the side slope angle in the embodiment of the present disclosure.

One aspect of the present disclosure provides an array substrate, the array substrate comprises a base substrate and a gate metal layer pattern, an active layer pattern, and a source/drain metal layer pattern that are arranged on the base substrate; the source/drain metal layer pattern comprises a first data line, and a side slope angle of the first data line is not greater than about 60°.

In the array substrate of the embodiment of the present disclosure, optimizing of the side slope angle of the data lines can reduce the interference on the liquid crystal molecules caused by the side electric field of the data lines, and therefore correspondingly the size of the black matrix in the display device corresponding to the data lines in the width direction of the data lines can be reduced, and the aperture ratio of the display device can be increased. The black matrix, for example, can be arranged on the opposite substrate that is opposite to the array substrate or be arranged on the array substrate.

It should be noted that, according to the present etching process, the data line in the section structural diagram along the width direction is substantially in a trapezoid structure. That is, in the array substrate, the width of the data line that is farther away from the base substrate is usually smaller than the width of the data line that is closer to the base substrate, for example, the data line in the section structural diagram along the width direction is substantially of an isosceles trapezoid shape. As mentioned above, the side slope angle of the first data line is the angle between the bevel edge and the bottom edge in the section structural diagram along the width direction of the data line. However, the angles between the two bevel edges and the bottom edge are not necessarily equal to each other, and those skilled in the art shall not interpret the embodiment in this way.

For example, the side slope angle of the first data line is in a range of about 40° to about 60°. For example, the side slope angle of the first data line is in a range of about 45° to about 55°. For example, the side slope angle of the first data line is in a range of about 50° to about 55°. Generally speaking, the smaller the side slope angle of the first data line is, the smaller the interference on the liquid crystal molecules resulting from the side electric field caused by the data line is. In the etching process of the data line, the value of the side slope angle is usually limited by actually used processes. Further the value ranges of the side slope angle of the data line can be limited to reduce the interference on the liquid crystal molecules resulting from the side electric field caused by the data line to a greater degree.

In an embodiment, the source/drain metal layer pattern further comprises a second data line that is adjacent to and in juxtaposition with the first data line, and a side slope angle of the second data line is not greater than about 60°. The technical effect of defining the side slope angle of the second data line can refer to the above descriptions about the technical effect of the first data line.

The value or the ranges of value are not necessarily strictly equal to the corresponding value in the embodiment of the present disclosure, instead, the deviation or error of the corresponding value in an range that is acceptable for those skilled in the art can be accepted, as long as the technical effect of the corresponding embodiment of the present disclosure can be achieved.

Figure 3A:
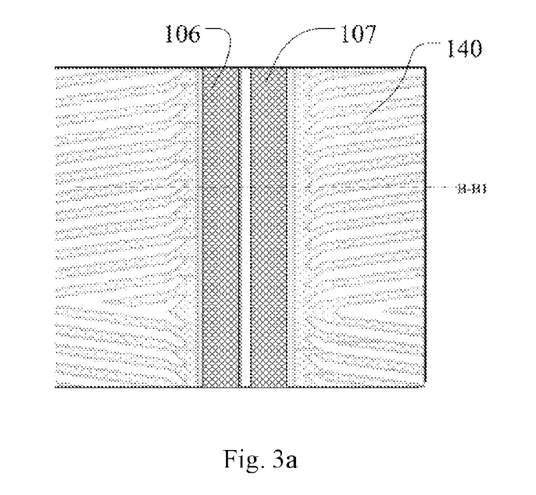
FIG. 3a is a top view schematic diagram of an array substrate comprising data lines that are arranged in juxtaposition with each other in an embodiment of the present disclosure.
Figure 3B:
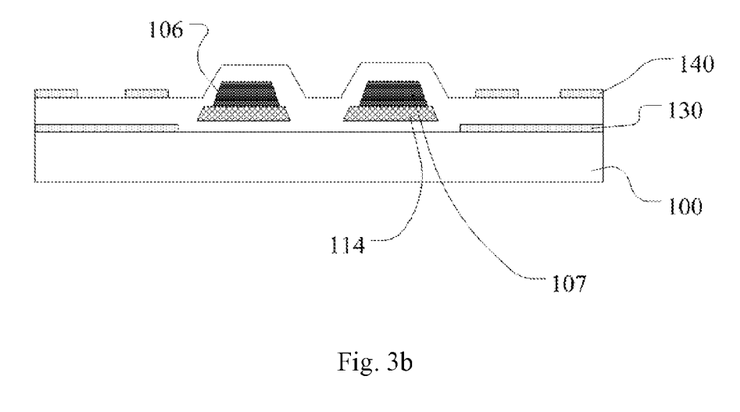
FIG. 3b is a section structural schematic diagram of FIG. 3a along the line B-B1.

FIG. 3a is a top view schematic diagram of an array substrate comprising data lines that are arranged in juxtaposition with each other in an embodiment of the present disclosure. FIG. 3b is a section structural schematic diagram of FIG. 3a along the line B-B1. Referring to FIG. 3a and FIG. 3b, the array substrate comprises a base substrate 100, and a gate metal layer pattern, a gate insulation layer, an active layer 114, a source/drain metal layer pattern, a common electrode 130 and a pixel electrode 140 that are arranged on the base substrate 100. For example, the gate metal layer pattern can comprise a gate line, a gate electrode that is connected with the gate line, a common electrode line and a common electrode 130 that is arranged in a pixel area. The active layer pattern 114, for example, can comprise a part that is used as a channel area of a TFT (thin film transistor) and a part that is arranged under the source/drain metal layer pattern. The source/drain metal layer pattern, for example, can comprise a data line, a source electrode and a drain electrode. Referring to FIG. 3a and FIG. 3b, for example, the data line comprises a first data line 106 and a second data line 107 that are in juxtaposition with each other, and a pixel electrode 140 that is arranged on the source/drain metal layer pattern, and for example, the pixel electrode 140 is a comb electrode. For example, as mentioned above, the side slope angles of the first data line 106 and the second data line 107 are not greater than about 60°.

For example, the side slope angle of the second data line is in a range of about 40° to about 60°. For example, the side slope angle of the second data line is in a range of about 45° to about 55°. For example, the side slope angle of the second data line is in a range of about 50° to about 55°. Further the value ranges of the side slope angle of the data line can be limited to reduce the interference on the liquid crystal molecules resulting from the side electric field caused by the data line on a greater degree.

As illustrated in FIG. 3a and FIG. 3b, the base substrate includes a plurality of pixel areas which are defined by the intersection between gate lines and data lines, the pixel areas are arranged in an array for example, and in each pixel area are provided the pixel electrode 140, a thin film transistor as a switching device, a common electrode, etc. The first data line 106 and the second data line 107 are provided between adjacent pixel areas. For example, a gate electrode of the thin film transistor in each pixel area is electrically connected to or integrally formed with a corresponding gate line, a source electrode thereof is connected to or integrally formed with a corresponding data line, and a drain electrode thereof is connected to or integrally formed with a corresponding pixel electrode.

Figure 4:
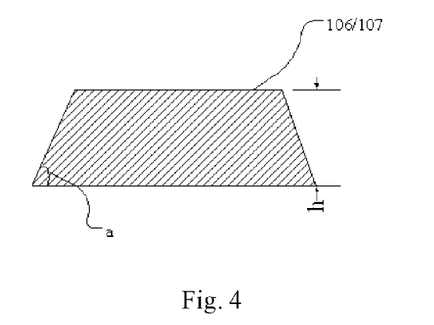
FIG. 4 is a schematic diagram of a thickness of a data line in an embodiment of the present disclosure.

On one hand, the thickness of the data line can influence the electric field caused by the data line, and further influence the interference degree on the liquid crystal molecules. Generally speaking, the larger the thickness of the data line is, the greater the interference on the deflection of the liquid crystal molecules resulting from the electric field produced by the two sides of the data line is. On the other hand, the increase of the thickness of the data line leads to the increase of the thickness of the liquid crystal panel. From this point of view, the smaller thickness of the data line is better. FIG. 4 is a schematic diagram of a thickness of a data line in an embodiment of the present disclosure. Referring to FIG. 4, for example, the thickness h of the first data line 106 in the thickness direction of the base substrate is in a range of about 2000 Å≤h≤about 3500 Å. For example, the thickness h of the first data line and the thickness h of the second data line in the thickness direction of the base substrate are in a range of about 2000 Å≤h≤about 3500 Å. Controlling of the thickness of the data line can effectively reduce the interference on the liquid crystal molecules resulting from the electric field caused by the data line, and better prevent the light leakage.

Figure 5:
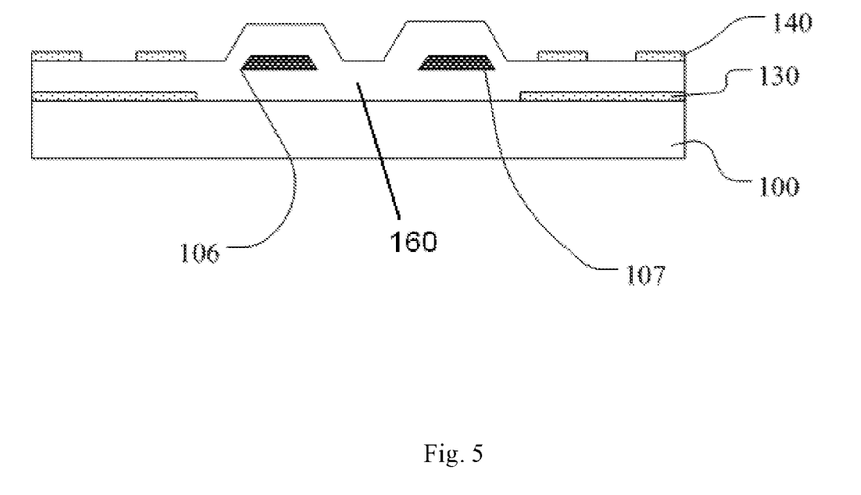
FIG. 5 is a structural schematic diagram of an array substrate in which an active layer is removed from a side that is closer to a base substrate of a data line in an embodiment of the present disclosure.

In an embodiment, a gate insulation layer is arranged on a side that is far away from the base substrate of the gate metal layer pattern; and a side, which is close to the base substrate, of the first data line directly contacts the gate insulation layer. FIG. 5 is a structural schematic diagram of an array substrate in which an active layer is removed from a side that is closer to a base substrate of a data line in an embodiment of the present disclosure. Referring to FIG. 5, a gate metal layer pattern, a gate insulation layer pattern, an active layer pattern, a source/drain metal layer pattern, a common electrode 130 and a pixel electrode 140 are arranged on a base substrate 100. The side, which is closer to the base substrate, of the first data line directly contacts the gate insulation layer 160. That is, the active layer does not exist between the data line 106 and the gate insulation layer 160. For example, the array substrate can be manufactured by a 5-mask process (using five exposure masks in the manufacture process). For example, the active layer is formed first. Then the source/drain metal layer pattern is formed. It should be noted that, when the array substrate is manufactured by the above mentioned 5-mask process, for example, the active layer on the side, which is closer to the base substrate, of the data line has been removed in etching the active layer pattern. FIG. 5 also shows a side, which is closer to the base substrate, of the second data line directly contacts the gate insulation layer 160. Further, in FIG. 5, the common electrode is arranged in the same layer as the gate metal layer pattern, for example, the common electrode can also be arranged on the source/drain metal layer pattern. Removal of the active layer under the data line can reduce the interference on the liquid crystal molecules resulting from the side electric field caused by the data line, and increase the aperture ratio of the display device.

In an embodiment, for example, one side of the array substrate is further provided with a black matrix that is arranged on the source/drain metal layer pattern, an orthographic projection of the first data line and an orthographic projection of the second data line on the base substrate are within an orthographic projection of the black matrix on the base substrate. For example, the black matrix can also be arranged on one side of the array substrate to reduce the alignment deviation of the array substrate and the opposite substrate. Thus, compared with the array substrate which does not comprises the data line with the decreased side slope angle as that in the embodiment of the present disclosure, the size of the black matrix of the array substrate in the width direction of the data line in the embodiment of the present disclosure can be designed to be smaller, thus increasing the aperture ratio of the display device. In addition, because the side slope angle of the data line is controlled in the embodiment of the present disclosure, the electric field that can interfere the movement of the liquid crystal molecules, which is caused by the data line when being applied with a voltage, can be reduced. Compared with the black matrix in the art of state, the size of the black matrix in the width direction of the data line in the embodiment of the present disclosure can be reduced further, thus further increasing the aperture ratio of the display device.

In manufacturing the array substrate, in order to reduce the side slope angle of the data line, the following methods can be used: (1) adjusting the concentration of the etching solution when etching in the patterning process, thus the side slope angle of the data line that is made of a metal material can be optimized after the etching process by way of the change of etching rate; (2) adjusting the photoresist curing process and the developing process in the photolithography process, after exposing and developing the photoresist, the side slope angle of the data line that is made of a metal material can be optimized by adjusting the process conditions of the subsequent treatment on the photoresist; (3) adjusting the thickness of the metal layer, generally speaking, the thicker the metal layer is, the greater the side slope angle is, or the thinner the metal layer is, the smaller the side slope angle is. For example, the side slope angle of the data line can be optimized to 40°-60° by way of any one of the above mentioned methods.

On the other hand, the present disclosure provides a display panel, the display panel comprises the array substrate according to any one of the above mentioned array substrates and an opposite substrate that is arranged opposite to the array substrate. The display panel with the array substrate in the embodiment of the present disclosure, for example, can reduce the size of the black matrix in the width direction of the data line, further increase the aperture ratio of the display panel, and prevent light leakage.

Figure 6:
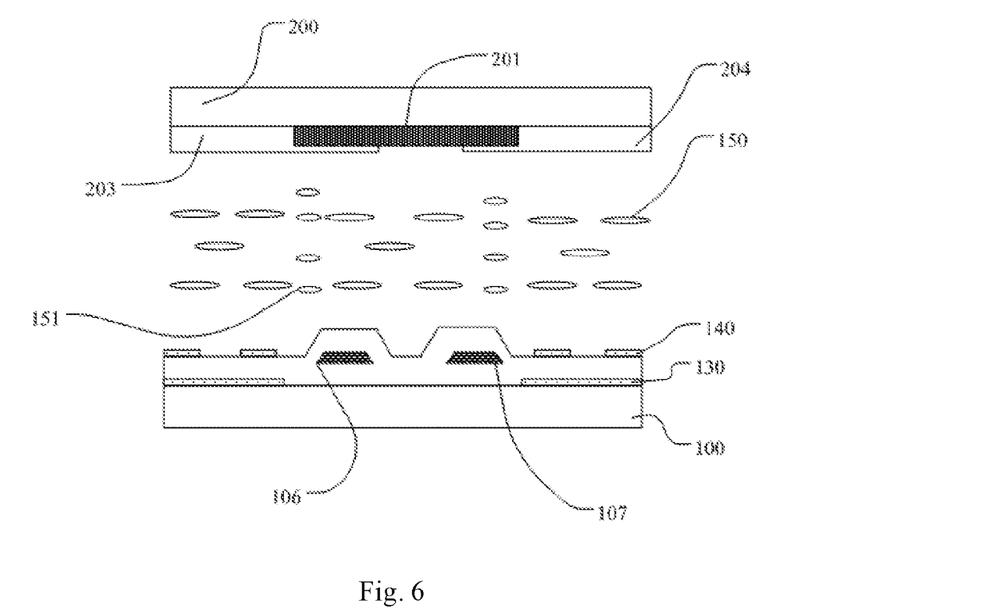
FIG. 6 is a section structural schematic diagram of a display panel in an embodiment of the present disclosure.

FIG. 6 is a section structural schematic diagram of a display panel in an embodiment of the present disclosure. Referring to FIG. 6, the display panel comprises an above mentioned array substrate, an opposite substrate that is arranged opposite to the array substrate, and liquid crystal molecules between the array substrate and the opposite substrate. For example, as shown in the drawing, the array substrate comprises a first data line 106 and a second data line 107 that are in juxtaposition with each other. For example, the data lines directly contact the gate insulation layer. For example, the black matrix 201 can be arranged on a side of the opposite substrate corresponding to the data line to shield the light leakage resulting from the interference on the liquid crystal molecules caused by the side electric field produced by the data lines when being applied with a voltage. As mentioned above, with the array substrate in the embodiment of the present disclosure, namely with the data line with the optimized side slope angle, the interference electric field produced by the data line when being applied with a voltage can be reduced. Referring to FIG. 6, the deflection amounts of the liquid crystal molecules 151 caused by the interference of the electrical field is reduced. Therefore, the size of the black matrix that is used for shielding the data line in the width direction of the data line becomes relatively smaller, thus increasing the aperture ratio of the display panel.

Figure 7:
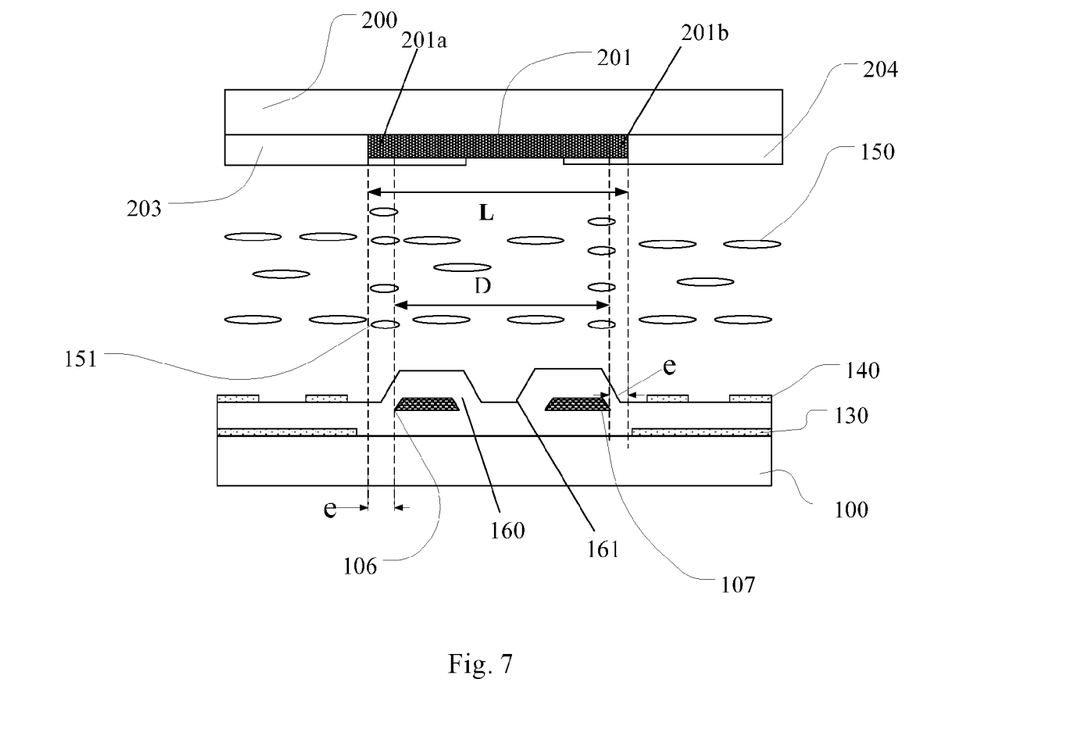
FIG. 7 is a section structural schematic diagram of a display panel in which a black matrix is arranged on a side of an opposite substrate in an embodiment of the present disclosure.

FIG. 7 is a section structural schematic diagram of a display panel in which a black matrix is arranged on a side of an opposite substrate with respect to the data lines in an embodiment of the present disclosure. Referring to FIG. 7, the source/drain metal layer pattern of the array substrate comprises a first data line 106 and a second data line 107 that are in juxtaposition with each other; the black matrix 201 is arranged on a side of the opposite substrate, which side faces the array substrate; in a display area, an orthographic projection of the first data line 106 and an orthographic projection of the second data line 107 on the base substrate 100 are within an orthographic projection of the black matrix 201 on the base substrate 100; in the width direction of the first data line, the lengths "e" of two sides of the black matrix exceeding beyond the outer opposite sides of the first data line and the second data line are in a range of about 2µm≤e≤about 10µm. It should be noted that, in the display area of the display panel, the black matrix in the thickness direction of the base substrate, for example, shield the data line, namely the orthographic projection of the data line on the base substrate is within the orthographic projection of the black matrix on the base substrate to ensure that the display panel does not suffers from light leakage. Because the side slope angle of the data line is optimized in the embodiment of the present disclosure, the size of the black matrix in the width direction of the data line can be reduced further, thus increasing the aperture ratio of the display device.

Reducing of the size of the black matrix in the width direction of the data line can increase the aperture ratio of the display panel. Considering the alignment deviation and the interference on the liquid crystal molecules caused by the side electric field produced by the data line when being applied with a voltage, the size of the black matrix in the width direction of the data line, for example, is slightly greater than the distance of the two outer opposite edges of the two data lines that are in juxtaposition with each other. That is, the two sides of the black matrix in the width direction of the data line exceed beyond the outer opposite edges of the two data lines that are in juxtaposition with each other, on one hand, compensating the light leakage caused by the alignment deviation in the cell assembly process, and on the other side, effectively shielding the light leakage caused by the side electric field produced by the data line when being applied with a voltage. Referring to FIG. 7, for example, in the width direction of the data line, the lengths "e" of two sides of the black matrix 201 exceeding beyond the outer opposite edges of the first data line 106 and the second data line 107 are in a range of about 4µm≤e≤about 8µm. For example, in the width direction of the data line, the lengths "e" of two sides of the black matrix 201 exceeding beyond the outer opposite edges of the first data line 106 and the second data line 107 are in a range of about 3µm≤e≤about 6µm. Further by adjusting the size of the black matrix, the aperture ratio of the display device can be increased with effectively preventing the light leakage of the display panel.

As illustrated in FIG. 7, in the width direction of the first data line and the second data line, the ratio of the width "L" of the black matrix 201 to a distance D between an outer side of the first data line and an outer side of the second data line is in a range of 1.5~2.0. The first portion 201a of the black matrix 201 is beyond the first data line 106 and has a width "e". The second portion 201b of the black matrix 201 is beyond the second data line 107 and has a width "e". Thus the distance D is equal to L−2e.

As illustrated in FIG. 7, the gate insulation layer 160 comprises a concave portion 161 between the first data line 106 and the second data line 107, and this concave portion 161 is helpful for releasing the stress in the display panel in the case where the display panel is a flexible display panel and for example the display panel is bent. The concave portion is not limited to be formed in the gate insulation layer 160 and can be formed in another layer/film (e.g., a passivation layer or overcoat layer) in the array substrate as long as such concave portion can render the surface of the array substrate have a concave portion as well and release the stress in the display panel.

Figure 8:
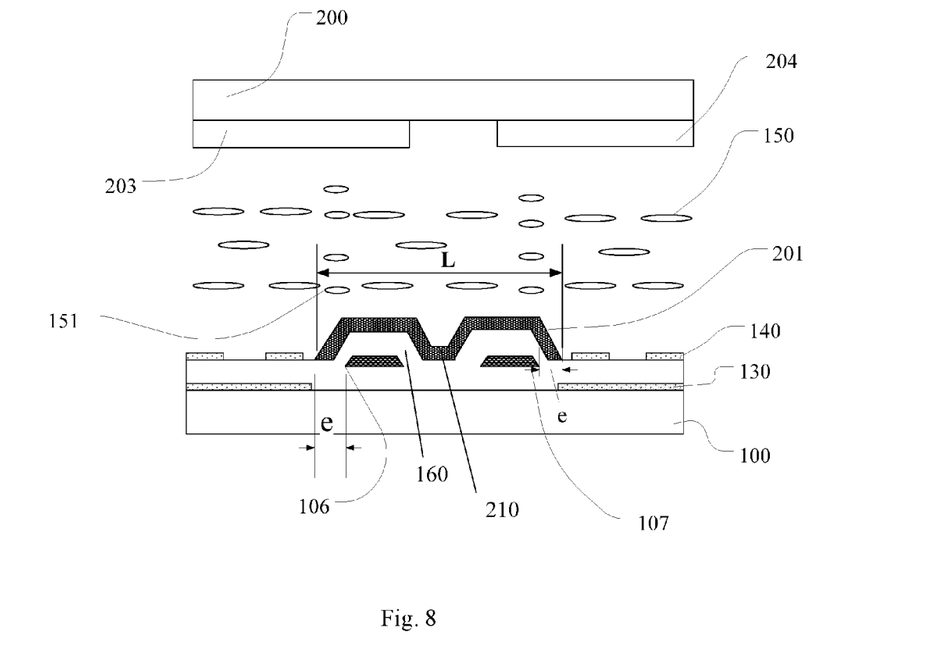
FIG. 8 is a section structural schematic diagram of a display panel in which a black matrix is arranged on a side of an array substrate in an embodiment of the present disclosure.

In an embodiment, the black matrix can also be arranged on a side of the array substrate. FIG. 8 is a section structural schematic diagram of a display panel in which a black matrix is arranged on a side of an array substrate in an embodiment of the present disclosure. Referring to FIG. 8, the source/drain metal layer pattern of the array substrate comprises a first data line 106 and a second data line 107 that are in juxtaposition with each other and between adjacent pixel areas; the black matrix 201 is arranged on a side of the array substrate; in a display area, an orthographic projection of the first data line 106 and an orthographic projection of the second data line 107 on the base substrate 100 are within an orthographic projection of the black matrix 201 on the base substrate 100; and in a width direction of the data line, the lengths "e" of two sides of the black matrix 201 exceeding beyond the outer opposite edges of the first data line 106 and the second data line 107 are in a range of about 1 µm≤e≤about 10 µm.

Also as illustrated in FIG. 8, in the width direction of the first data line and the second data line, the ratio of the width "L" of the black matrix 201 to a distance D between an outer side of the first data line and an outer side of the second data line is in a range of 1.5~2.0. The first portion 201a of the black matrix 201 is beyond the first data line 106 and has a width "e". The second portion 201b of the black matrix 201 is beyond the second data line 107 and has a width "e". Thus the distance D is equal to L−2e.

As illustrated in FIG. 8, corresponding to the concave portion of the gate insulating layer 160, the black matrix 201 comprises a concave portion 210 between the first data line 106 and the second data line 107, and also this concave portion 210 is helpful for releasing the stress in the display panel in the case where the display panel is a flexible display panel and for example the display panel is bent.

As mentioned above, the side slope angle of the data line in the embodiment of the present disclosure is optimized, and therefore the size of the black matrix in the width direction of the data line can be designed smaller, thus increasing the aperture ratio of the display device. In the embodiment, the black matrix is arranged on a side of the array substrate, eliminating the cell alignment deviation of the array substrate and the opposite substrate, and therefore the size of the black matrix in the width direction of the data line can be designed smaller, thus further increasing the aperture ratio of the display device. In another aspect, the present disclosure provides a manufacture method of a curved display panel, in the method, the curved display panel is obtained by bending the display panel according to any one of the above mentioned array substrates. As mentioned before, the manufacture method of the curved display panel usually comprises bending the plane display panel according to the required curvature in a mechanical way, and the curved display panel is obtained by fixing the shape after the required curvature being obtained. Because the size of the black matrix in the width direction of the data line is reduced, the displacement at different positions between the black matrix of the opposite substrate and the array substrate is reduced in the manufacturing process of applying the plane display panel to produce the curved display panel, thus increasing the display uniformity of the curved display panel.

Another embodiment of the present disclosure provides a curved display panel that is manufactured by the above mentioned method. The size of the black matrix of the curved display panel becomes smaller, thus increasing the display uniformity, and the aperture ratio of the display panel becomes bigger.

Further another embodiment of the present disclosure provides a flexible display panel that comprises any of the above-mentioned array substrates and can be manufactured by the above mentioned method. The size of the black matrix of the flexible display panel becomes smaller, thus increasing the display uniformity, and the aperture ratio of the display panel becomes bigger. In order to implement the flexible display panel, the base substrate of the array substrate and the opposite substrate are made of a flexible substrate, for example, a plastic substrate, such as a polyimide (PI) substrate.

Still another embodiment of the present disclosure provides a display device, the display device comprises the curved display panel or the flexible display panel according to the above mentioned display panels. The display device possesses good display uniformity and great aperture ratio.

Figure 9:
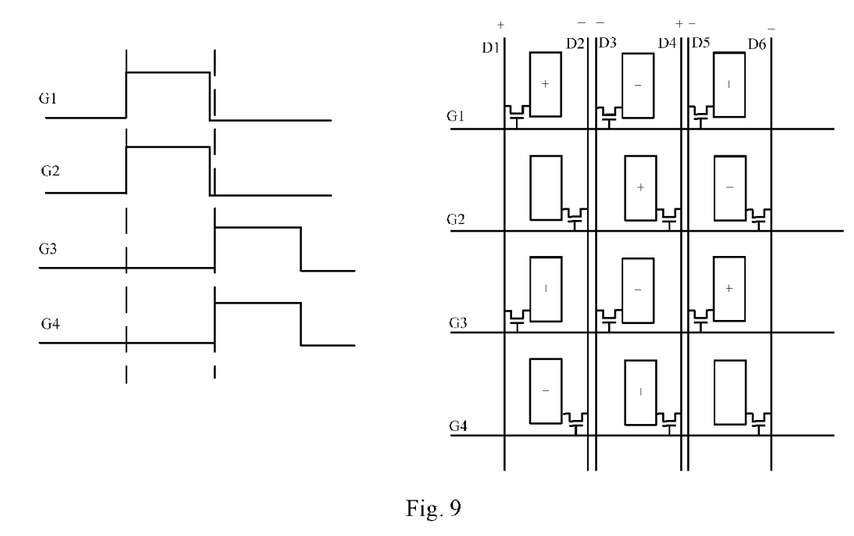
FIG. 9 is a schematic view illustrating arrangement of pixel areas and gate signals applied to the gate lines according to an embodiment of the present disclosure.

FIG. 9 is a schematic view illustrating arrangement of pixel areas and gate signals applied to the gate lines according to an embodiment of the present disclosure. As illustrated, gate lines G1~G4 extending in the horizontal direction and data lines D1~D6 extending in the vertical direction intersect to define pixel areas. For example, data lines D2 and D4 are the examples of the first data lines in the above-described embodiments, and data lines D3 and D5 are the examples of the second data lines in the above-described embodiments. The pair of data lines D2 and D3 are in parallel with each other and between adjacent pixel areas, and further they are connected to the thin film transistors of different pixel areas in different rows. The pair of data lines D4 and D5 are in the same configuration. FIG. 9 shows only a portion of the display panel, and the present disclosure is not limited to the showing. For a high PPI (pixels per inch) display panel, two adjacent gate lines can be applied with ON signals for turning on the thin film transistors simultaneously. For example, as shown in FIG. 9, gate lines G1 and G2 are applied with ON signals (high level signal) simultaneously and two rows of pixel areas corresponding to the gate lines G1 and G2 are turned on and charged for display; also in a next circle gate lines G3 and G4 are applied with ON signals simultaneously and two rows of pixel areas corresponding to the gate lines G3 and G4 are turned on and charged for display. This way of applying gate signals can meet the requirements of high refresh frequency for a high PPI display panel.

In this description, the terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. The specific meaning of the term in the present disclosure can be explained according to the specific situation for those skilled in the art.

What are described above is related to the illustrative embodiments of the disclosure only and not limitative to the scope of the disclosure. The protection scope of the disclosure shall be based on the protection scope of the claims.

What is claimed is:

1. An array substrate, comprising:
  a base substrate comprising a plurality of pixel areas,
  a first data line on the base substrate and between adjacent pixel areas; wherein a side slope angle of the first data line is not greater than about 60°,
  a second data line that is adjacent to and in juxtaposition with the first data line and also between the adjacent pixel areas, and a side slope angle of the second data line is not greater than about 60°, and
  an insulation layer on the first data line and the second data line, wherein the insulation layer comprises a concave portion between the first data line and the second data line;
  a black matrix that is arranged over the first data line and the second data line, wherein an orthographic projection of the first data line and an orthographic projection of the second data line on the base substrate are within an orthographic projection of the black matrix on the base substrate.

2. The array substrate according to claim 1, wherein a thickness of the first data line in a thickness direction of the base substrate is in a range of about 2000 Å to about 3500Å.

3. The array substrate according to claim 1, wherein both of a thickness of the first data line and a thickness of the second data line in a thickness direction of the base substrate are in a range of about 2000Å to about 3500Å.

4. The array substrate according to claim 1, wherein the black matrix comprises a concave portion between the first data line and the second data line.

5. A flexible display panel comprising:
  the array substrate according to claim 1; and
  an opposite substrate that is arranged opposite to the array substrate.

6. The flexible display panel according to claim 5, wherein the array substrate further comprises a concave portion between the first data line and the second data line.

7. A display device comprising the flexible display panel according to claim 5.

8. The array substrate according to claim 1, wherein in a width direction of the data line, a ratio of a width of the black matrix to a distance between an outer side of the first data line and an outer side of the second data line is in a range of 1.5~2.0.

9. The array substrate according to claim 1, wherein in a width direction of the data line, lengths of two sides of the black matrix exceeding beyond the first data line and the second data line are in a range of about 4 µm to about 8 µm.

* * * * *